(12) United States Patent
Chanda (10) Patent No.: US 8,380,583 B1
(45) Date of Patent: Feb. 19, 2013

(54) SYSTEM FOR EXTRAPOLATING ITEM CHARACTERISTICS

(75) Inventor: Gaurav Chanda, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 794 days.

(21) Appl. No.: 12/343,360

(22) Filed: Dec. 23, 2008

(51) Int. Cl.
*G06Q 30/00* (2006.01)

(52) U.S. Cl. .................................. 705/26.7; 705/26.64

(58) Field of Classification Search .................... None
See application file for complete search history.

(56) References Cited

U.S. PATENT DOCUMENTS

| | | | |
|---|---|---|---|
| 5,583,763 A | 12/1996 | Atcheson et al. | |
| 5,909,023 A * | 6/1999 | Ono et al. | 235/380 |
| 6,185,558 B1 | 2/2001 | Bowman et al. | |
| 6,321,221 B1 | 11/2001 | Bieganski | |
| 6,356,879 B2 | 3/2002 | Aggarwal et al. | |
| 6,438,579 B1 * | 8/2002 | Hosken | 709/203 |
| 6,460,036 B1 | 10/2002 | Herz | |
| 6,691,163 B1 * | 2/2004 | Tufts | 709/224 |
| 6,782,370 B1 * | 8/2004 | Stack | 705/7.29 |
| 6,912,505 B2 * | 6/2005 | Linden et al. | 705/14.53 |
| 7,092,936 B1 * | 8/2006 | Alonso et al. | 707/737 |
| 7,152,061 B2 | 12/2006 | Curtis et al. | |
| 7,386,547 B2 * | 6/2008 | Grasso et al. | 1/1 |
| 7,440,943 B2 * | 10/2008 | Grasso et al. | 1/1 |
| 7,720,720 B1 | 5/2010 | Sharma et al. | |
| 7,752,077 B2 * | 7/2010 | Holden et al. | 705/26.1 |
| 7,756,879 B2 * | 7/2010 | Parsons et al. | 707/748 |
| 7,853,485 B2 * | 12/2010 | Song et al. | 705/26.8 |
| 7,912,755 B2 | 3/2011 | Perry et al. | |
| 7,953,740 B1 | 5/2011 | Vandon et al. | |
| 2002/0019763 A1 * | 2/2002 | Linden et al. | 705/10 |
| 2002/0052873 A1 * | 5/2002 | Delgado et al. | 707/7 |
| 2002/0198882 A1 * | 12/2002 | Linden et al. | 707/10 |
| 2003/0023499 A1 * | 1/2003 | Das et al. | 705/26 |
| 2003/0023538 A1 * | 1/2003 | Das et al. | 705/37 |
| 2003/0130975 A1 * | 7/2003 | Muller | 706/50 |
| 2004/0254911 A1 * | 12/2004 | Grasso et al. | 707/1 |
| 2005/0189415 A1 * | 9/2005 | Fano et al. | 235/383 |
| 2005/0222987 A1 | 10/2005 | Vadon | |
| 2006/0041548 A1 * | 2/2006 | Parsons et al. | 707/5 |
| 2006/0167757 A1 * | 7/2006 | Holden et al. | 705/26 |
| 2006/0212362 A1 * | 9/2006 | Donsbach et al. | 705/26 |
| 2007/0078849 A1 | 4/2007 | Slothouber | |
| 2007/0118498 A1 * | 5/2007 | Song et al. | 707/1 |
| 2008/0004989 A1 * | 1/2008 | Yi | 705/27 |

OTHER PUBLICATIONS

Schafer, J. Ben, et al., "Recommender Systems in E-Commerce," Proceedings of the 1$^{st}$ ACM Conference on Electronic Commerce, ACM Press, Nov. 1999, pp. 158-166.

M. K. Condliff, et al., "Bayesian Mixed-Effect Models for Recommender Systems," ACM S[GIR '99 Workshop on Recommender Systems: Algorithms and Evaluation, 1999.

(Continued)

*Primary Examiner* — Mussa Shaawat
(74) *Attorney, Agent, or Firm* — Knobbe Martens Olson & Bear LLP (57) ABSTRACT

A system is provided that extrapolates item characteristics from items considered to possess a characteristic to items not known to possess the characteristic. The system may include an item data repository that stores data representing physical items. These items can include first items having a characteristic and second items not known to have the characteristic. A characteristic extrapolation module can extrapolate the characteristic from at least some of the first items to at least some of the second items based at least in part on the strength of associations between the plurality of items. A recommendations module may provide item recommendations based at least partly on the characteristic of the items.

15 Claims, 6 Drawing Sheets

OTHER PUBLICATIONS

Robin Burke, "Hybrid Recommender Systems: Survey and Experiments," published in User Modeling and User-Adapted Interaction, vol. 12, No. 4, Nov. 2002, pp. 331-370 (ISSN: 0924-1868).

Eirinaki, M., et al., SEWep: Using Site Semantics and a Taxonomy to Enhance the Web Personalization Process, ACM Press, SIGKDD '03, dated Aug. 24-27, 2003, pp. 99-108.

Andrew I. Schein et al., "Methods and metrics for cold-start recommendations," Proceeding of the $25^{th}$ annual international ACM SIGIR conference on Research and development in information retrieval, 2002, pp. 253-260.

Schafer, Ben J., "E-Commerce Recommendation Applications", Data Mining and Knowledge Discovery, vol. 5, pp. 115-153, 2001.

* cited by examiner

SYSTEM FOR EXTRAPOLATING ITEM CHARACTERISTICS

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

In some instances, however, behavior-based associations may generate low quality associations or no associations at all for certain items. The quantity of behavioral data collected for a particular item, for instance, may be insufficient to create behavior-based associations for that item. This may be the case when new items are added to an electronic catalog or when new web pages or documents are added to a data repository. In addition, the quantity of behavioral data can also be insufficient to create behavior-based associations for items that are rarely purchased.

Behavior-based associations can also generate low-quality associations for popular items. Popular items tend to be associated behaviorally with many other items simply because many people buy the popular items along with other unrelated items. As a result, for example, a best selling novel might become behaviorally-associated with an unrelated item such as a pen knife.

BRIEF DESCRIPTION OF THE DRAWINGS

Specific embodiments will now be described with reference to the drawings, which are intended to illustrate and not limit the various features of the inventions. In the drawings, similar elements have similar reference numerals.

DETAILED DESCRIPTION OF SPECIFIC EMBODIMENTS

Many recommendations systems select items to recommend to users based on behavioral associations detected between items. Some recommendations systems may also use other recommendation mechanisms for behaviorally-deficient items and popular items. For instance, a recommendations system might use content-based associations to find items that are similar to items the user has selected. The system could then recommend items to the user that are behaviorally associated with the content-associated items.

The content of items may be determined based on information about items' characteristics or attributes. This can be in the form of metadata associated with the item. The metadata could be technical specifications, descriptions, brands, reviews, sizes, capacities, genres, authors, publishers, among many other possibilities. As some items may have incomplete data regarding characteristics, poor content-based associations may be made, resulting in poor behaviorally-associated items being recommended to users. For example, some items having an "adult" characteristic might not be designated as adult in an electronic catalog. If a non-adult item such as a children's book were mistakenly content-associated with an unmarked adult item, a recommendations system could find behavioral associations that include adult items. In addition to being bad recommendations, these recommendations could offend many users.

This disclosure describes various processes for taking item characteristics into account when providing recommendations for behaviorally-deficient and/or other items. In certain implementations, a characteristic may be extrapolated from items known to have the characteristic to items that are not known to have the characteristic. Items that were not designated as being adult, for instance, could be automatically designated adult through this extrapolation process. The extrapolated characteristics may be used, for example, to improve recommendations and/or to categorize items, among other uses.

For purposes of illustration, the processes are described primarily in the context of a system that detects associations among catalog items (e.g., products) for the purpose of recommending such items to users of an e-commerce web site. However, the disclosed processes can also be used in other types of systems, and can be used to recommend other types of items, such as but not limited to web sites, specific pages within websites, news articles, blogs, podcasts, travel destinations, service providers, other users, events, discussion boards, photos and other images, online videos, tagged items, and user-generated lists of items. In addition, the disclosed processes need not be implemented as part of, or in conjunction with, a web site.

As used herein, the term "item" is used interchangeably to refer to an item itself (e.g., a particular product) and to its description or data representation in a computer system. As will be apparent from the context in which it is used, the term is also sometimes used herein to refer only to the item itself or only to its data representation in the computer system.

Figure 1:
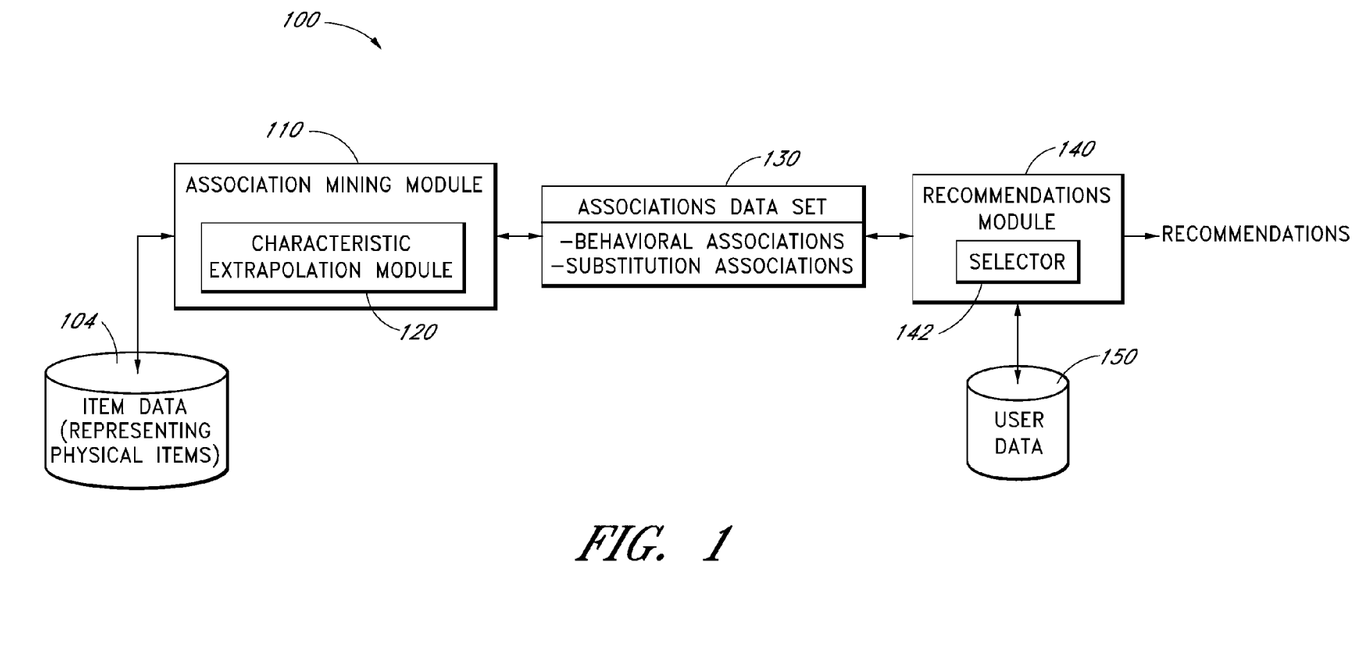
FIG. 1 illustrates an embodiment of a characteristic extrapolation system.

Turning to FIG. 1, an embodiment of a characteristic extrapolation system 100 is shown. The characteristic extrapolation system 100 includes components for extrapolating item characteristics from certain items to other items. In the depicted embodiment, these extrapolated characteristics are used to enhance item recommendations. Other example uses for extrapolated item characteristics are also described below.

The characteristic extrapolation system 100 includes an association mining module 110 that may include hardware and/or software for analyzing item data stored in an item repository 104. The item repository 104 may include physical computer memory that includes stored data representations of real, physical items. The real items represented by the item data may include any of the items described above, such as products. In the context of e-commerce, for example, the items can include books, movies, music, television shows, apparel, electronic books ("e-books"), electronics, software, academic papers, and the like.

In certain embodiments, the association mining module 110 creates behavioral and/or substitution associations between items. The association mining module 110 can detect behavioral associations between two items based at least partly on a number of people who bought both items. In one embodiment, the more people who bought both items, the stronger the behavioral association the association mining module 110 for those items. The association mining module 110 can also detect substitution associations between two items based on an analysis of their attributes, item categories in an electronic catalog, and the like. The association mining module 110 may also create substitution associations between items that were selected by users in a single electronic catalog browsing session. In one embodiment, the more similar attributes and/or categories that two items share, and/or the more users that selected two items in the same session, the stronger the substitution association the module 110 may create for those items.

In certain implementations, the association mining module 110 detects behavioral associations using the association mining techniques described in U.S. Pat. No. 6,912,505 and/or U.S. Provisional Application No. 61/110,498, the disclosures of which are hereby incorporated by reference in their entirety. In addition, the association mining module 110 may detect substitution associations using the association mining techniques described in U.S. Publication No. 2008/0004989 filed Jun. 16, 2006, entitled "Extrapolation of Behavior-Based Associations to Behavior-Deficient Items," the disclosure of which is hereby incorporated by reference in its entirety.

The association mining module 110 may generate association scores that reflect the degree of similarity between items. The association mining module 110 may store the associations and accompanying scores as item-to-item mappings in an associations data set 130. In certain embodiments, the item-to-item mappings or associations may be stored in tables or other data structures of the associations data set 130.

In the depicted embodiment, the association mining module 110 includes a characteristic extrapolation module 120. The characteristic extrapolation module 120 may include one or more software components for analyzing items in the associations data set 120 to detect characteristics of items. The characteristic extrapolation module 120 may, for example, extrapolate a characteristic from first items known to possess the characteristic to second items not known to possess the characteristic. The characteristic extrapolation module 130 may infer that these second items possess the characteristic in certain embodiments by analyzing the quantity and/or strength of associations between the first and second items. The characteristic extrapolation module 120 may analyze substitution associations, behavioral associations, or both. In one embodiment, for example, the characteristic extrapolation module 120 may infer that items that have strong substitution associations with items known to have a characteristic should be considered to have that characteristic as well.

The characteristic can be a physical attribute, quality, or the like that reflects a type of item (e.g., a category the item belongs in) or features of an item. In certain embodiments, the characteristic is an inherent attribute of an item. Thus, the characteristic is not an item association in certain implementations. Example characteristics of digital cameras might be, for instance, optical zoom, megapixels, and so forth. Items may be considered to possess the characteristic or not; or alternatively, different items may be considered to possess varying degrees of a characteristic. To illustrate, one characteristic of certain items may be adultness, or obscenity. In some implementations, items may be considered adult or not adult. Items may also be considered to have varying degrees of adultness. Data that reflects one or more characteristics, such as a numerical value, may be stored in association with each item in the item data repository 104. This characteristic data may alternatively be stored in the associations data set 130.

The characteristic data stored in the item repository 104 and/or in the association data set 130 may used for a number of purposes. For instance, the characteristic data may be used to cluster search results, to classify or categorize items, to reclassify items that were mis-classified, and the like. Reclassification may be useful, for example, for systems that use automated item categorization. The reclassification may be assisted by a human operator in some instances. As a few examples, the characteristic data may be used to identify all books by a certain author, accessories that match a certain digital camera, movies and books about politics, software that is open source, and so forth.

The characteristic data may also be used to enhance recommendations. Thus, a recommendations module 140 is provided in certain embodiments that includes one or more software components for analyzing user activity data to generate recommendations. The recommendations module 140 may obtain the user activity data from a user data repository 150, which may have one or more physical computer storage devices. User activity data may include (in the example context of e-commerce) users' purchase histories, item viewing histories, item download histories, item rental histories, item ratings, and item tags, among other possible activity data.

By analyzing the user activity data, the recommendations module 140 may determine items selected by the user, e.g., for viewing, purchase, download, or the like. The recommendations module 140 may then obtain items from the associations data set 130 that are behaviorally- or content-associated with the selected items. These items can be candidate recommendations, from which the users' actual recommendations may be selected from.

In certain embodiments, the recommendations module 140 includes a selector module 142 that refines, filters, or otherwise selects recommendations from the candidate recommendations. The selector module 142 has one or more software components for selecting the recommendations based at least partly on characteristic data stored about items. The selector module 142 can determine whether the candidate recommendations have different characteristics from the items in the user's selection history and prevent these items from being recommended. Additionally, the selector module 142 can cause items with characteristics similar to user-selected items to be given greater weight as recommendations. As will be described in greater detail below, the functions of the selector module 142 may be particularly useful in embodiments where recommendations are made based on behaviorally-deficient items.

To illustrate, some items having an "adult" characteristic might not be designated as adult in an electronic catalog. However, the characteristic extrapolation module 120 can extrapolate adult characteristics to items not previously marked adult. Thereafter, based on a user's previous viewing of an item that is not adult (e.g., a children's book), the recommendations module 140 may generate candidate recommendations that include some adult items, e.g., due to imperfections in the associations data set 130. The selector 142 may access characteristic data for these candidate recommendations, determine that they are adult, and remove them from the candidate recommendations. The resulting recommendations may be more targeted to the user.

Moreover, in certain embodiments, the recommendations system 140 automatically filters out adult recommendations for users who have profile data indicating that they are minors. Users can also choose to allow or disallow adult recommendations. More generally, the system 100 may allow users to choose not to be shown adult items while browsing or searching in the electronic catalog. The system 100 may also automatically prevent minor users from being shown adult items during browsing or searching in the electronic catalog. In still other embodiments, various characteristics may be used by the system 100 to improve search engine results, product categorizations in a hierarchical browse structure, and the like.

Alternative embodiments contemplate that at least some of the features of the selector module 142 may instead be incorporated into the characteristic extrapolation module 120. The characteristic extrapolation module 120 may, for instance, use characteristic information about items to improve associations generated by the association mining module 110. For instance, the characteristic extrapolation module 120 could transform the associations data set 120 to a new associations data set by improving associations based on the extrapolated characteristic data.

Figure 2:
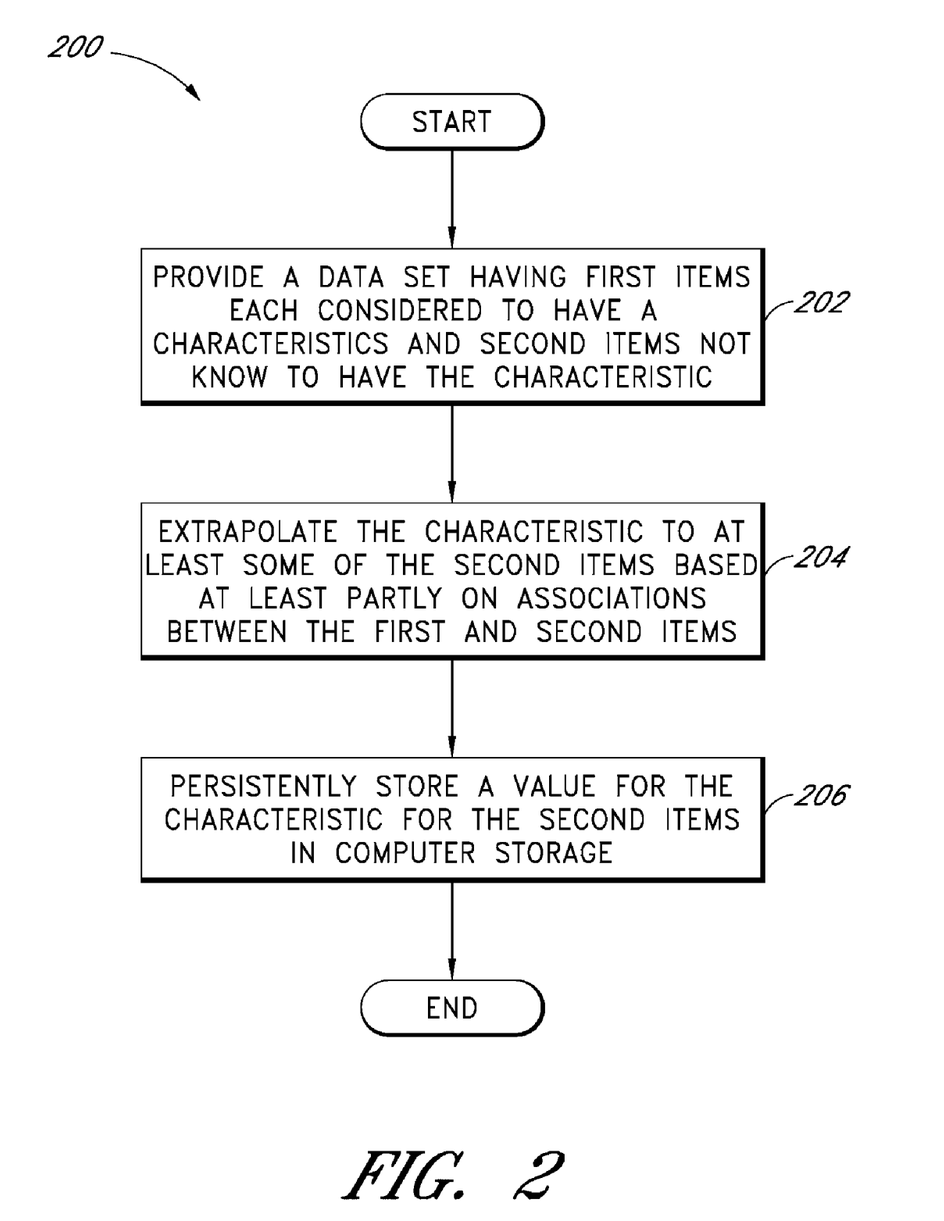
FIG. 2 illustrates an embodiment of an extrapolation process for extrapolating characteristics to items.

FIG. 2 illustrates an embodiment of an extrapolation process 200 for extrapolating a characteristic to items. The process 200 is implemented in one embodiment by the characteristic extrapolation system 100. In particular, the process 200 may be implemented by the characteristic extrapolation module 120. Advantageously, in certain embodiments the extrapolation process 200 enables items not known to have a characteristic to be attributed that characteristic.

At block 202, a data set is provided that includes first items each considered to have a characteristic and second items not know to have the characteristic. The first items may be assigned a value, for example, that represents a degree to which each first item possesses the characteristic. The value might be on a scale of 0 to 1, for instance, where 1 indicates likely possession of the characteristic and 0 indicates likely non-possession of the characteristic. Other scales may be chosen.

In certain embodiments, the values for the characteristic may be provided by item vendors to an electronic catalog of items. Each item vendor might, for instance, include the value or a textual description of the characteristic in an item description that the vendor submits to the electronic catalog. These values are seed values in certain implementations, in that these values represent initial characteristic values assigned to items in the electronic catalog. The seed values may also be assigned at least in part by the operator of the electronic catalog.

However, either intentionally or unintentionally, vendors may not always indicate that their items possess a certain characteristic or may indicate that the item possess a characteristic that is not accurate. As a result, certain items in the electronic catalog, such as adult items, may not be considered to have the characteristic. Thus, at block 204, the characteristic is extrapolated from at least some of the first items to at least some of the second items. This extrapolation may occur based at least partly on associations (e.g., behavior-based or substitution associations) between the first and second items. For instance, when a first item is closely associated with a second item (e.g., has a relatively high association score), the characteristic of the first item may be extrapolated to the second item. The degree of association used for causing extrapolation to occur may be determined heuristically, experimentally, and/or automatically. In certain embodiments, the closer the association between the first and second items, the higher the value that is assigned to the second item for that characteristic.

The quality of the extrapolations may depend on a number of factors. For instance, the higher the quality of the associations, the better extrapolations may be in certain embodiments. Also, some characteristics may not lend well to extrapolation. For example, the characteristic of "books by a certain author" may not extrapolate well because people may consider books by different authors to be substitutable. In addition, the quality of characteristic extrapolation can increase if the initial seed of items having the characteristic is representative enough that the propagation reaches all or substantially all parts of an electronic catalog. In contrast, if just one item were marked as adult in a catalog of millions of items, for instance, the extrapolation may not reach all the items.

Additionally, although the extrapolation process 200 is described in the context of items of an electronic catalog, the extrapolation process 200 may be used in many other contexts, as described above. For instance, the extrapolation process 200 may extrapolate a characteristic of one web site to another or may extrapolate one user profile to another in a social network. These extrapolated characteristics may be used to recommend web sites or social profiles, among other things.

Specific example implementations for extrapolating items are described below with respect to FIG. 3. The new values assigned to the second items are persistently stored in computer storage at block 206.

Figure 3:
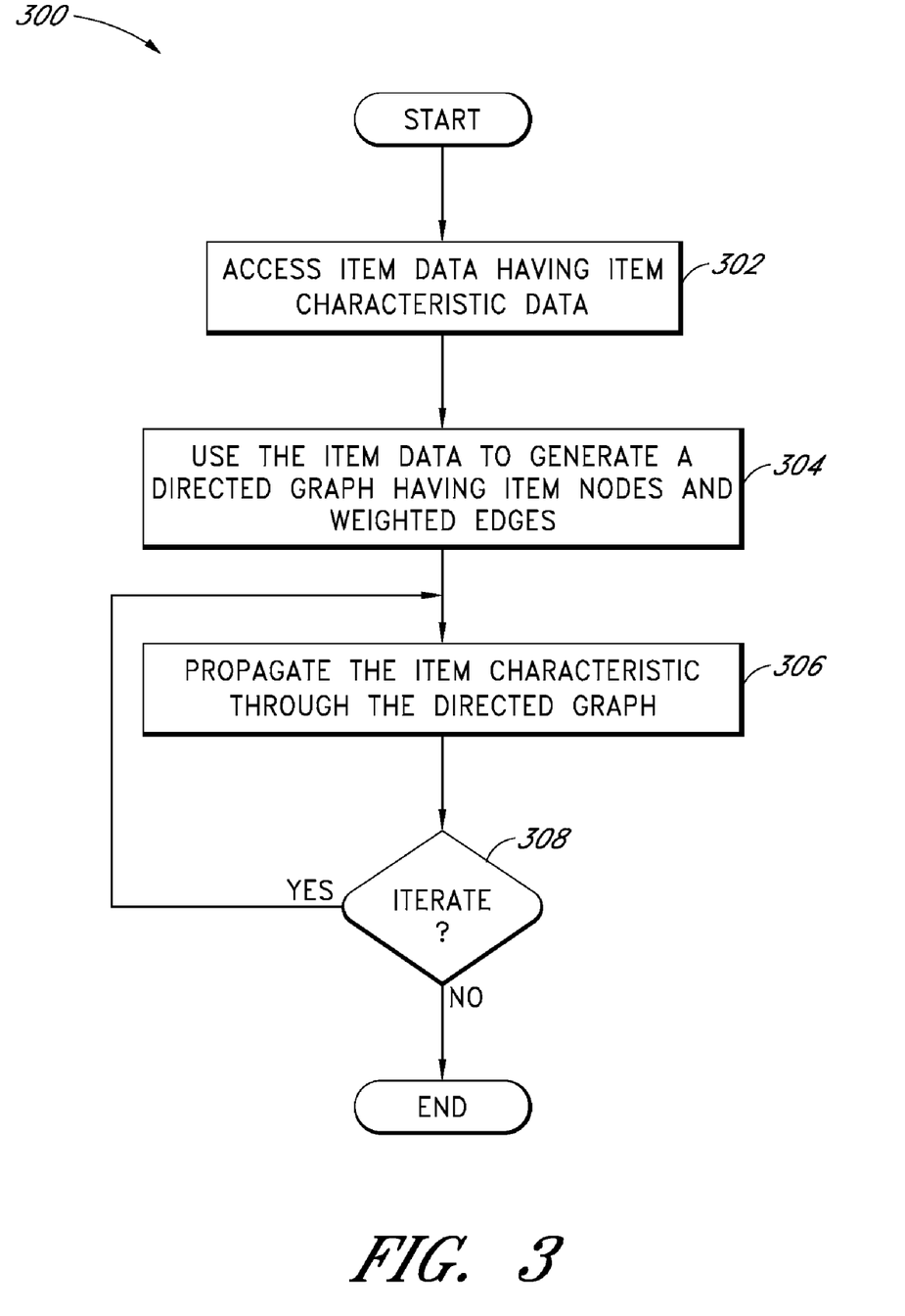
FIG. 3 illustrates another embodiment of an extrapolation process for extrapolating characteristics to items.

FIG. 3 illustrates a more detailed embodiment of an extrapolation process 300 for extrapolating characteristics to items. The extrapolation process 300 is a more detailed view of block 204 of the extrapolation process 200 (FIG. 2). The extrapolation process 300 may be implemented by the characteristic extrapolation system 100 described above. In one embodiment, the extrapolation process 300 may be implemented by the characteristic extrapolation module 120. Advantageously, in certain embodiments, the extrapolation process 300 causes an item characteristic possessed by certain items to be automatically extrapolated to other items.

At block 302, item data may be accessed, for example, from an electronic catalog. The item data includes item characteristic data representing one or more characteristics of various items. This characteristic data can include, for instance, data values that represent whether an item possesses certain characteristics, data values that represent an extent or degree to which an item possesses certain characteristics, textual data describing certain characteristics possessed by an item, combinations of the same, and the like.

The item data may further include data representing associations between certain items of the electronic catalog. The associations may have been detected, for instance, using the associations mining module 110. The associations may be substitution associations, behavioral associations, or the like.

The item data may also include items that are not behaviorally- or substitution-associated with other items or which have weak associations.

One simplified example set of item data might include four items in an electronic catalog: items A1, A2, B, and C. In this example, the items A1 and A2 are considered to possess a characteristic, such as adultness, while it is not known whether items B and C possess the characteristic. The item data includes data values representing the characteristic for each item, with a 1 indicating that the item has the characteristic and a 0 indicating that the item does not or is not known to have the characteristic. In this example, items A1 and A2 have a characteristic value of 1, while items B and C have a characteristic value of 0. These initial values may be seed values provided by item vendors or the like. These values may be updated or changed, as will be described below.

For the purposes of this example, the items have the following directional associations shown in Table 1:

TABLE 1

Example Associations

| Item | Associations | Rank |
|------|--------------|------|
| A1   | C            | 0    |
|      | A2           | 1    |
|      | B            | 2    |
| A2   | C            | 0    |
|      | A1           | 1    |
| B    | [none]       | N/A  |
| C    | [none]       | N/A  |

Thus, item A1 is associated with items C, A2, and B. Items B and C, however, are not associated with any other items. In Table 1, the associations are listed in order of their rank (with 0 being highest), which may be determined by a score (not shown) representing the degree of association. For instance, the strongest association with item A1 is C, the second strongest is item A2, and so forth. In the present example, the associations are bidirectional (e.g., A1 has one association with A2 and A2 has a different association with A1) but need not be in other implementations.

Continuing with the extrapolation process 300, a directed graph is generated at block 304. The directed graph is one example of a data structure that may be used to extrapolate characteristics to items. The directed graph includes, in the depicted embodiment, nodes that represent items and weighted edges between the nodes. The graph may be implemented using an adjacency list or matrix, a disjoint-set data structure, a graph-structured stack, a scene graph, combinations of the same, and the like. In addition, the graph need not be directed in some implementations. Moreover, data structures other than graphs, such as lists or trees, may be used in other embodiments to extrapolate characteristics to items.

Figure 4A:
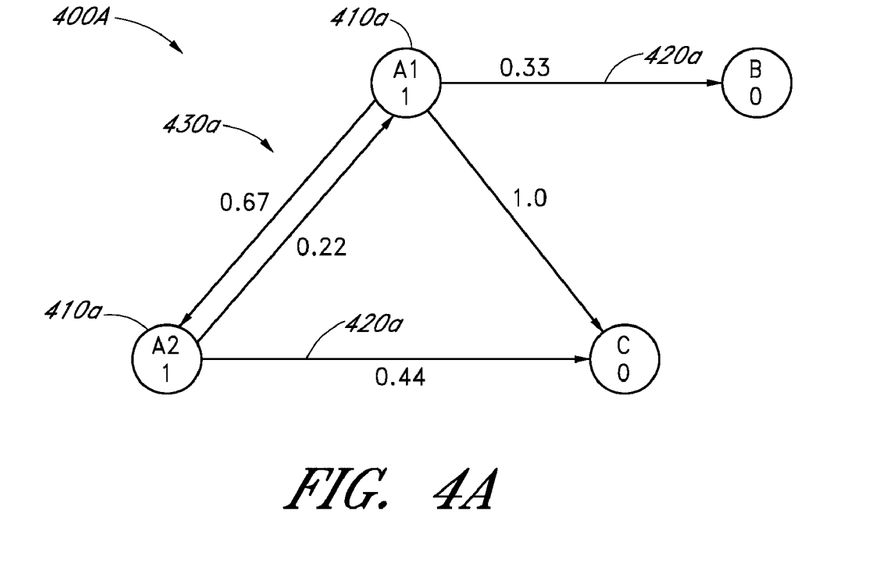
FIG. 4 illustrates an example graph data structure for extrapolation characteristics to items.

Referring to FIG. 4A, an example directed graph 400A is shown for the items A1, A2, B, and C. The graph 400A includes nodes 410a and weighted edges 420a. Each node 410a represents one of the items. In addition, each node 410a is associated with the initial characteristic value. For instance, the node 410a representing A1 is associated with the characteristic value of 1. Each edge 420a is represented by an arrow pointing from one node 410a to another in a direction that indicates an association. For instance, the edge 420a pointing from A2 to C indicates that A2 is associated to C, but not that C is associated to A2. Each edge 420a has a value or weighting 430a. These weightings are described below.

Referring again to FIG. 3, the item characteristic is extrapolated to certain items by propagating the characteristic through the directed graph. In certain embodiments, this propagation may include determining, for each node in the graph, a weighted sum of contributions from incoming and outgoing nodes. The weighted sum may be considered to be a new or updated characteristic value for each node. For instance, the weighted sum may be represented by the following:

$$C(x) = C_0(x) + \alpha \cdot \text{contribution}_{out} + \beta \cdot \text{contribution}_{in} \quad (1)$$

where $C(x)$ represents the characteristic value for a node (or item) x, $C_0(x)$ represents the initial characteristic value for the node (or item), $\text{contribution}_{out}$ and contribution represent contributions from outgoing and incoming nodes, respectively, and $\alpha$ and $\beta$ are constants that may be adjusted experimentally to achieve a desired propagation.

As described above, the initial or seed values for each item in the example above are as follows:
$C_0(A1)=1$
$C_0(A2)=1$
$C_0(B)=0$
$C_0(C)=0$ As indicated by equation (1), these characteristic values for each item (represented by a node) may be updated as the characteristic is propagated through the graph 400A.

In order to determine $\text{contribution}_{out}$ and $\text{contribution}_{in}$, contribution factors may be calculated. These contribution factors can be used as weights of the edges 430a of FIG. 4. Each $\text{contribution}_{out}$ and contribution can be calculated by multiplying the contribution factors for each edge by the characteristic value for each node. An example of this calculation is described below.

One possible formula for calculating the contribution factors is as follows:

$$\text{Contribution Factor} = \frac{n-k}{N} \cdot \frac{n}{N} \cdot C(x) \quad (2)$$

where n represents a number of associations of an item (or node) x, k indicates the rank of an association with a particular item (or node) u, N represents a maximum number of associations between two items, and $C(x)$ represents the characteristic value for the item x. The number of associations N may be the actual maximum number of associations or may represent a subset of the actual number of associations (e.g., a number of highest-scored associations). The value of N may also be predetermined, e.g., experimentally.

Equation (2) illustrates that the more associated items n there are with an item x, the higher the contribution of the edge between node x and node u could be. In addition, the stronger the association from the node u as indicated by the rank k, the higher the contribution from the edge. However, the more associations are available (N), the less contribution any one edge may have. The n/N term is included in certain embodiments to account for items that have few associations (e.g., one or two). This term gives higher weight if there are more associations n because, in certain embodiments, more associations increases the confidence in the value of the contribution factor.

Equations (1) and (2) can be illustrated in the context of the four-item example described above. In this example, the ranks k are ranked from 0 to 2, with 0 representing the highest rank. In addition, N is 3 in this example because the maximum number of associations (in one direction) is 3. The contribution factors for each edge (e.g., the edge 430a of FIG. 4) may be computed using equation (2) as follows:

$$A2 \to A1 : \text{Contribution Factor} = \frac{2-1}{3} \cdot \frac{2}{3} \cdot 1 = 0.22 \qquad (3)$$

$$A1 \to A2 : \text{Contribution Factor} = \frac{3-1}{3} \cdot \frac{3}{3} \cdot 1 = 0.67$$

$$A1 \to B : \text{Contribution Factor} = \frac{3-2}{3} \cdot \frac{3}{3} \cdot 1 = 0.33$$

$$A1 \to C : \text{Contribution Factor} = \frac{3-0}{3} \cdot \frac{3}{3} \cdot 1 = 1$$

$$A2 \to C : \text{Contribution Factor} = \frac{2-0}{3} \cdot \frac{2}{3} \cdot 1 = 0.44$$

Thus, for example, the edge from A1 to A2 is computed using an n value of 3, an N value of 3, a k value of 1, and a C(A1) value of 1 and a C(A2) value of 1. The computed contribution factors are shown as the edge weights 430a in FIG. 4.

Figure 4B:
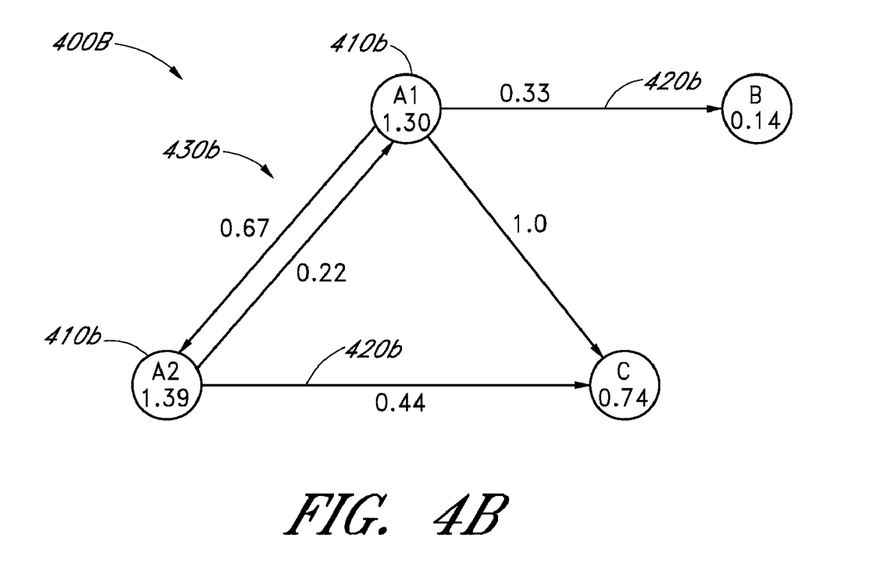

With contribution factors calculated for each edge, in one embodiment the characteristic may be propagated through the graph 400A. Using a first iteration of equation (1), the characteristic values may be updated as follows, using values of ⅓ for both constants α and β:

$C_1(A1) = 1 + ⅓*(0.33*0 + 1.0*0 + 0.67*1) + ⅓*(0.22*1)$
$= 1.30$ $C_1(A2) = 1 + ⅓*(0 + 0.22*1.30) + ⅓*(0.67*1.30) = 1.39$ $C_1(B) = 0 + ⅓*0 + ⅓*(0.33*1.30) = 0.14$ $C_1(C) = 0 + ⅓*0 + ⅓*(1.0*1.30 + 0.67*1.39) = 0.74$ where, for example, in the calculation of $C_1(A1)$, the (0+0+ 0.67*1) term represents contributions from outgoing edges to A1 (namely, B's contribution of 0 plus C's contribution of 0 plus A2's contribution of the 0.67 contribution factor times $C_0(A2)$). Similarly, the term (0.22*1) represents the contribution from incoming edges to A1 (i.e., from A2). In the calculation of $C_1(A2)$, the new value of 1.30 for $C_1(A1)$ is used, illustrating that the updated characteristic values propagate through the graph 400. The new characteristic values $C_1(x)$ values are shown in a graph 400B of FIG. 4B.

Referring again to FIG. 3, at decision block 308, it is determined whether to iterate the propagation of the item characteristic. If so, the extrapolation process 300 loops back to block 306. Another iteration using the example above could result in the following updated characteristic values:

$C_2(A1) = 1 + ⅓*(0.33*0.14 + 1.0*0.74 + 0.67*1.39) + ⅓*(0.22*1.39) = 1.67$ $C_2(A2) = 1 + ⅓*(0.44*0.74 + 0.22*1.67) + ⅓*(0.67*1.67) = 1.60$ $C_2(B) = 0 + ⅓*0 + ⅓*(0.33*1.67) = 0.18$ $C_2(C) = 0 + ⅓*0 + ⅓*(1.0*1.67 + 0.67*1.60) = 0.91$

In this particular example, the characteristic value of C has increased at a faster rate than the characteristic value of B. This difference has resulted in this example because C has a relatively higher degree of association with both A1 and A2 than B, and because both A1 and A2 were known to have the characteristic. In addition, the contribution factors from A1 and A2 to C were both relatively higher than the contribution factors to B. Thus, C has been extrapolated a relatively higher value for the characteristic than B, indicating that C is more likely to possess the characteristic than B.

If another iteration is not desired, then the extrapolation process 300 ends. The number of iterations chosen may be determined experimentally, for example, by an operator of the electronic catalog. The operator may spot-check items to determine if the character values appear accurate, for instance. Alternatively, a predetermined number of iterations may be performed. For example, at least two iterations may be performed. The number of iterations may be determined and/or adjusted based on the number of items in the item data, the number of items initially assigned or seeded with the item characteristic, or based on other criteria. In certain embodiments, the extrapolation process 300 may be performed periodically, such as monthly, weekly, daily, or more frequently.

Figure 5:
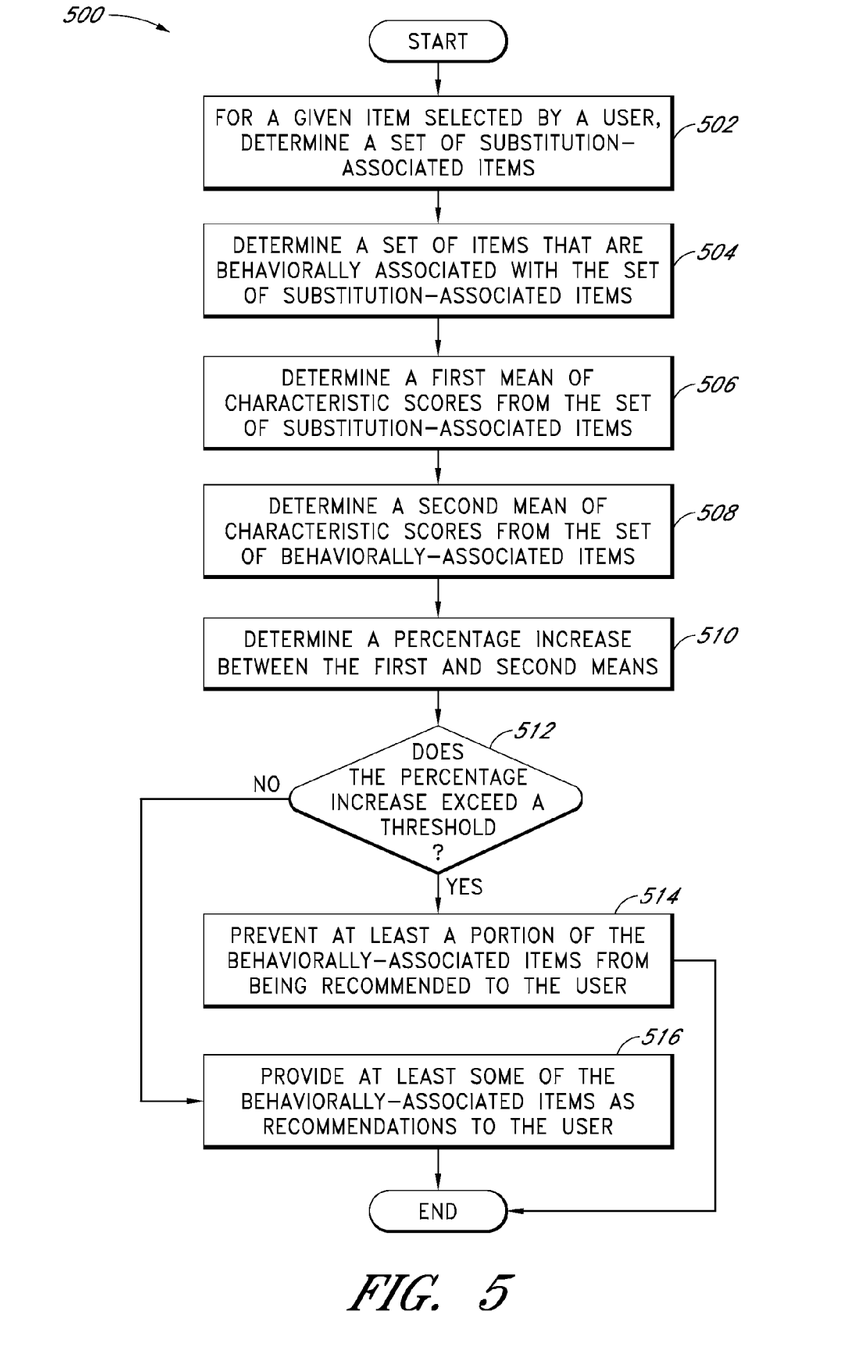
FIG. 5 illustrates an embodiment of a recommendation process for recommending items based at least partly on characteristic information.

FIG. 5 illustrates one example of a recommendation process 500 that may use characteristic data to select items for recommendation to a user. The recommendation process 500 may be implemented by the recommendations module 140 of FIG. 1. The recommendations process 500 illustrates one possible implementation of using characteristic data to improve recommendations for behaviorally-deficient items.

In one scenario, a user browsing an electronic catalog or searching through a search engine may select one or more items for viewing, downloading, purchasing, or the like. The recommendation module 140 may provide recommendations to the user by using the user's item selection history to find items that are behaviorally associated with items the user selected. However, some items may be behaviorally deficient, as described above. Thus, the recommendation module 140 may access substitution-associations to find items that are substitution-similar (e.g., content-similar) to one or more items in the user's history. Then, the recommendation module 140 can use the substitution-associations to find items that are behaviorally associated with the substitution-associated items.

For items that are improperly categorized or not categorized at all, there may be poor substitution-associations with those items, resulting in poor behavioral associations being recommended to the user. For example, as noted above, if a non-adult item in the user's history were considered substitution-similar to an adult item, the resulting behavioral associations could include more adult items. Thus, in certain embodiments, the recommendation process 500 takes characteristics such as adultness into account in providing recommendations for behaviorally-deficient items.

Starting at block 502, for a given item selected by a user, a set of substitution-associated items is determined. At block 504, a set of items are determined that are behaviorally associated with the set of substitution-associated items. For purposes of illustration, suppose that an item A in the user's selection history has 10 substitution-associated items {S1, S2, . . . , S10}, listed in descending order of substitution association rank (based on scores that are not shown). From these 10 substitution-associated items, 10 behaviorally-associated items {B1, B2, . . . , B10} are obtained, listed in descending order of behavioral association rank. The adultness characteristic values for these items in this example, which may be determined using the techniques described above, are as follows:

S1 (0.89), S2 (0.21), S3 (0.18), S4 (0.19), S5 (0.2), S6 (0.22), S7 (0.18), S8 (0.21), S9 (0.22), S10 (0.2)

B1 (0.89), B2 (0.89), B3 (0.92), B4 (0.91), B5 (0.9), B6 (0.87), B7 (0.88), B8 (0.91), B9 (0.88), B10 (0.9).

To determine whether the S and B associations are significantly different in adultness values, the mean adultness for each set can be compared. Thus, at block 506, a first mean of characteristic scores from the set of substitution-associated items is determined, which in this example is 0.27. A second mean of characteristic scores is determined at block 508 for the set of behaviorally-associated items. This mean is 0.895. The disparity between the means may result from the highest-ranked substitution-associated item S1 having a relatively high adultness value of 0.89. This item may have resulted in the detection of several behaviorally-associated items with relatively high adultness.

At block 510, a percentage increase is determined between the first and second means. In the example above, this percentage increase equals $((0.895-0.27)/0.27)*100=231.48\%$. It is determined at decision block 512 whether the percentage increase exceeds a threshold. In one embodiment, the threshold might be 200%. If the threshold is exceeded, at block 514, at least a portion of the behaviorally-associated items are prevented from being recommended to the user. Thus, in the example, the behaviorally-associated items might be discarded from a recommendations list. For instance, some or all behaviorally-associated items that are attributable to the substitution-associated item S1 might be discarded, as S1 had a relatively high adultness score. If the threshold was not exceeded, at least some of the behaviorally-associated items are provided as recommendations to the user at block 516.

In other embodiments, a percentage increase is not used to determine which recommendations to provide to the user. Instead, for instance, adultness scores of the behaviorally-associated items can be compared to an adultness (or other characteristic) threshold. However, comparing the percentage increase to a threshold can be advantageous in some embodiments to determine when the behaviorally-associated items are potentially much different from the substitution-associated items. In other embodiment, additional statistical techniques may be used to determine compare adultness (or other characteristics).

The techniques described with respect to the recommendations process 500 may also be used to select items having a desirable characteristic to recommend. If the percentage increase is below a threshold, for instance, the behaviorally-associated items may be considered to have the desired characteristic.

Figure 6:
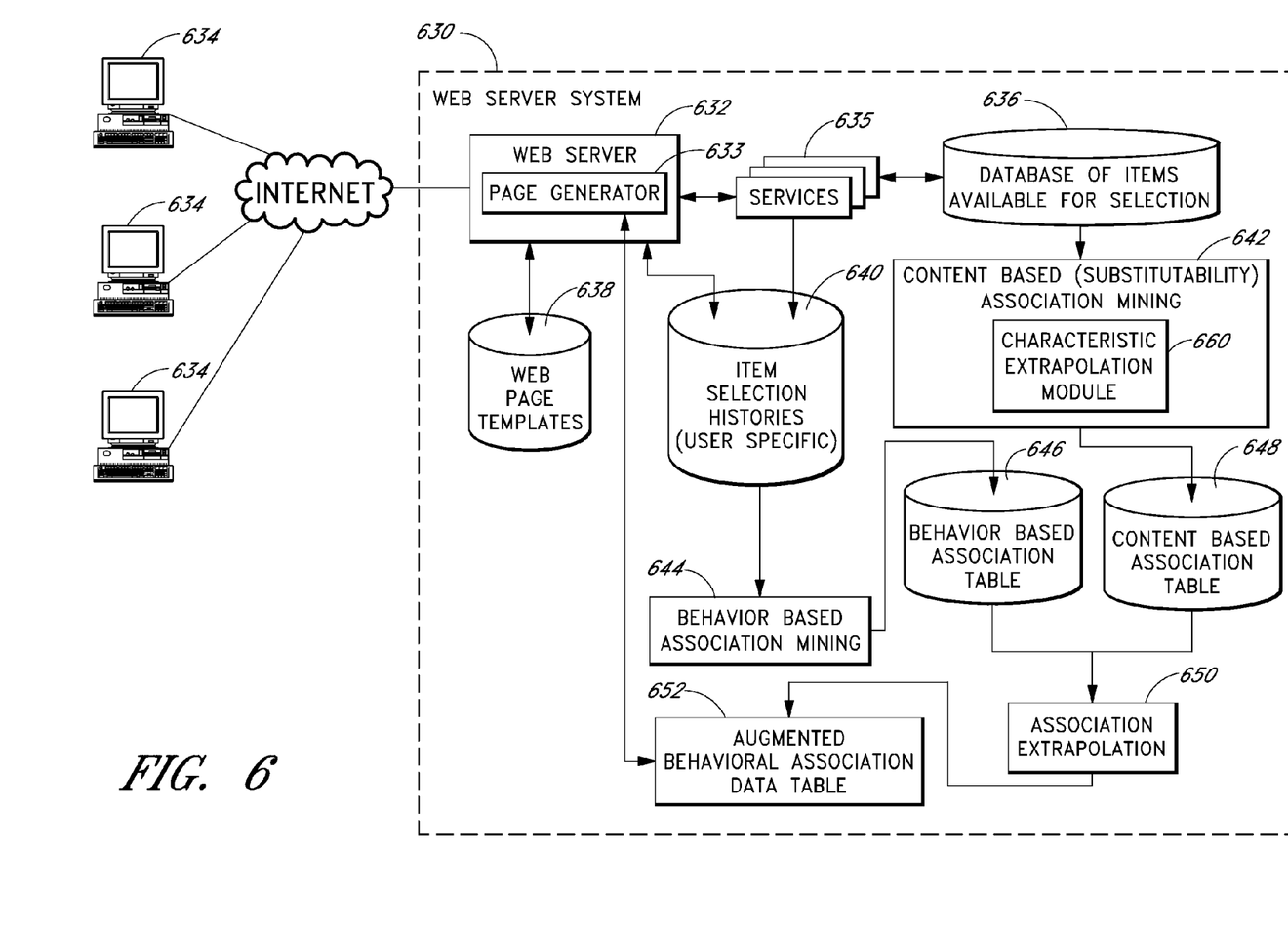
FIG. 6 illustrates one example of how various extrapolation and recommendation features may be implemented in the context of a web-based electronic catalog system.

FIG. 6 illustrates an embodiment in which certain of the features described above are employed for purposes of detecting associations between items represented in an electronic catalog. The detected associations between items may be used for various purposes, such as to supplement item detail pages with lists of related items and/or to generate personalized recommendations for particular users. See, e.g., U.S. Pat. No. 6,912,505 and/or U.S. Provisional Application No. 61/110,498, referred to above.

The electronic catalog can contain item content supplied by many different entities. For example, some of the item content may be supplied by a variety of different marketplace sellers, as described in U.S. Pub. 2003/0200156 A1, the disclosure of which is hereby incorporated by reference in its entirety. As a result, the catalog data may lack a sufficient degree of uniformity or consistency to reliably detect substitution-associations between items based on item content. Consequently, behavior-based associations may be more reliable than substitution-associations. The potential unreliability of substitution-associations can result, for example, in the adultness-detection problems described above.

As depicted, a web server system 630 includes a web server 632 that generates and serves pages of a host web site to computing devices 634 of end users. Although depicted as desktop computers for purposes of illustration, the computing devices 634 may include a variety of other types of devices, such as cellular telephones and personal digital assistants (PDAs). The web server 632 may be implemented as a single physical server or a collection of physical servers, which may be geographically separate or co-located.

The web server 632 provides users with access to an electronic catalog of items represented within a database 636 or a collection of databases. The items represented in the database 636 may include items that may be purchased, rented, licensed, downloaded, or otherwise acquired via the web site (e.g., consumer electronics products; household appliances; book, music and video titles in physical and/or downloadable form; magazine subscriptions, computer programs, documents, etc.). The items may include physical products that are shipped to users and/or digital products that are delivered over a network. The catalog data stored for a given item in the database 636 typically includes a number of different attributes (e.g., name, manufacturer, author, category, subject, color, browse node, price, etc.), which may be represented as name-value pairs. Different catalog items may have different attributes. The items may be arranged within a hierarchy of browse categories to facilitate navigation of the catalog.

The web server 632, which may include any number of physical servers, runs a page generator component 633 that dynamically generates web pages in response to requests from the user computing devices 634. The web pages are generated using a repository of web page templates 638, using data retrieved from a set of services 635. The types of services 635 can vary widely, and may include, for example, a catalog service that returns catalog data for particular items, a search service that processes search queries submitted by users, a recommendation service that generates and returns personalized item recommendations for users, and a transaction processing services that processes purchases and/or other types of transactions.

In one embodiment, users of the web site can obtain detailed information about each item by accessing the item's detail page within the electronic catalog. Each item detail page may be located by, for example, conducting a search for the item via a search engine of the web site, or by selecting the item from a browse tree listing. Each item detail page may provide an option for the user to acquire the item from a retail entity (e.g., an operator of the system 630) and/or from another user of the system.

The web server system 630 and/or the services 635 maintain item selection histories 640 for each user of the web site. The item selection history 640 of each user identifies catalog items selected by that user via the web site, preferably together with the associated dates and times of selection. Depending upon the nature and purpose of the web site (e.g., retail sales, user-to-user sales, movie rentals, customer reviews, music downloads, etc.), the item selection histories may, for example, include item purchase histories, item rental histories, item detail page viewing histories, item download histories, or any combination thereof. In some embodiments, the item selection histories 640 may include data obtained from external sources, such as the web site systems of business partners, browser toolbars of users, or customer credit card records. Each user account may be treated as a separate user for purposes of maintaining item selection histories; thus for example, if members of a household share a single account, they may be treated as a single user.

A behavior-based association mining component 644 of the system 630 collectively analyzes or "mines" the item selection histories of the users periodically (e.g., once per day) to detect and quantify behavior-based associations between particular catalog items. The methods described in U.S. Pat. No. 6,912,505 and/or U.S. Provisional Application No. 61/110,498, referenced above, may be used for this purpose. The behavior-based association mining component 644 may generate a table 646 or other data structure that identifies pairs of items for which a behavior-based association has been detected. For each such pair of items, the table 646 may also store a behavioral association strength value or "weight" indicating the strength of the association.

The associations may be based on any type or types of recorded user activity, such as purchases, rentals, viewing events, shopping cart adds, and/or downloads. The strength of the association between two item can depend on how many unique users who selected one item (for purchase, viewing, etc.) also selected the other, among other factors. These counts are proportioned against the individual item selection counts. Using the proportions, significance tests or signal processing techniques may be performed to reduce the number of invalid associations due to noise in the data. Each entry in the table 646 may, for example, be in the form of a one-to-many mapping that maps a particular item to a list of the most closely related items, together with associated weights. Behavior-based associations that fall below a selected strength threshold may be excluded from the table 646.

Also shown is a content-based association mining component 642 that periodically and collectively mines the electronic database of items 636 to detect and quantify content-based associations between particular catalog items. The content-based associations are one example of substitution-associations. The content-based association mining component 642 generates a content-based associations table 648 that identifies pairs of items that share similar characteristics or content. For each such pair, the table 648 also stores a respective content-based association strength value or weight representing the strength of the content-based association. Each such weight value also generally represents the degrees to which the corresponding items are substitutable or interchangeable with each other.

Any of a variety of methods for comparing item attributes may be used to detect and quantify the content-based associations. Techniques from natural language processing such as simple inter-document term frequency or more complicated algorithms such as latent semantic analysis may be used. Also, pattern recognition techniques such as neural networks or Bayesian belief networks operating over the content feature space may be used. Content-based associations that fall below a selected threshold (e.g., 80% similarity if the strengths are in a probabilistic domain) may be excluded from the table 648. The content-based analysis may be limited to pairs of items in which one of the two items is a behavior-deficient item.

The content-based association mining component 642 further includes a characteristic extrapolation module 660. The characteristic extrapolation module 660 includes one or more software components that perform characteristic extrapolation or propagation. The characteristic extrapolation module 660 may analyze the associations in the content-based association table 648, for example, to extrapolate item characteristics, using the techniques described above. The characteristic extrapolation module 660 can be provided as a separate module from the content-based association mining component 642 in certain implementations.

In addition to the extrapolation of item characteristics described above, extrapolation of associations for behavior deficient items may be performed by the system 630. The behavior-based and content-based associations tables 646, 648 are periodically analyzed in combination by an association extrapolation component 650 to selectively extrapolate or propagate behavior-based associations to unpopular items, as described above. For example, if the behavior-based table 646 indicates that B is behaviorally associated with C, D and E, and the content-based table 648 indicates that unpopular item U has a content-based association with B, the association extrapolation component 650 may create associations between U and C, U and D, and U and E. The association extrapolation component 650 thereby effectively augments the behavior-based associations table 646 with these extrapolated associations, particularly for "behavior-deficient" items. This augmented behavioral association data table is depicted as element 652, although the augmented table may actually be created by simply adding new entries to the behavior-based associations table 646. The task of creating extrapolated associations may, for example, be triggered by the generation of a new behavior-based associations table 646.

In certain embodiments, the association extrapolation component 650 may also perform certain of the functions described above with respect to FIG. 5 in order to improve the quality of the augmented behavioral association data table 652. For instance, the association extrapolation component 650 may analyze the characteristics of items in extrapolated associations to improve these associations. Using the example of FIG. 5, the association extrapolation component 650 may determine the relative adultness of content-based and behavior-based associations and may not create associations if the relative adultness is above a threshold. In other embodiments, certain of these features (e.g., described in FIG. 5) may instead be performed by a recommendations service 635.

As with the behavior-based association table 646, the augmented behavioral association data table 652 includes an association weight value for each pair of associated items. For extrapolated associations, the weights are generated based on the corresponding behavior-based and content-based weights, as described below. These extrapolated association weights are preferably normalized with (on the same scale as) the purely behavior-based weights.

The augmented behavioral association data table 652 may be used for a variety of purposes. For example, when a user accesses an item detail page of an item, the web server 632 may access the augmented behavioral association data table 652 to look up a list of related items, and may incorporate this list into the item detail page. If the item detail page is for an unpopular item, this list or related items will ordinarily be based exclusively on extrapolated associations created for the unpopular item. The augmented behavioral association data table 652, including the association weights stored therein, may also be used to generate personalized recommendations that are based on the item selections of the target user. The methods described in U.S. Pat. No. 6,912,505, referenced above, may be used for this purpose. As yet another example, the augmented behavioral association data table 652 may be used to augment a search results set with one or more items that are closely related to those that match the user's search query.

Each of the processes and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process blocks may be stored, persistently or otherwise, in any type of computer storage.

The various features and processes described above may be used independently of one another, or may be combined in various ways. All possible combinations and subcombinations are intended to fall within the scope of this disclosure. In addition, certain method or process steps may be omitted in some implementations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A system for extrapolating item characteristics to improve recommendations related to behaviorally-deficient items, the system comprising:
   an item data repository comprising physical computer storage, the item data repository storing item data representative of a plurality of items in an electronic catalog, the plurality of items comprising first items having a characteristic and second items not known to have the characteristic;
   an association mining module operative to programmatically analyze the item data to generate substitution associations between first ones of the plurality of items and behavioral associations between second ones of the plurality of items;
   a characteristic extrapolation module operative to programmatically extrapolate the characteristic from at least some of the first items known to have the characteristic to at least some of the second items not known to have the characteristic based at least partly on a strength of the substitution associations, wherein the characteristic extrapolation module is further configured to extrapolate the characteristic by propagating the item characteristic through a directed graph, the directed graph comprising nodes and edges connecting the nodes, each of the nodes representing one of the plurality of items and being associated with a characteristic value that represents the characteristic, each of the edges representing one of the substitution associations, wherein the characteristic extrapolation module propagates the characteristic by at least updating the characteristic values of the nodes based at least in part on the strength of the substitution associations represented by the edges connecting the nodes; and
   a recommendations module operative to generate for a user item recommendations that do not have the characteristic, the recommendations module configured to:
   (1) access a selected item from user activity data corresponding to the user, the selected item having a deficiency of behavioral data,
   (2) access one or more substitute items having substitution associations with the selected item,
   (3) access one or more behavioral items having behavioral associations with the one or more substitute items, and
   (4) select at least a portion of the behavioral items to recommend to the user that do not have the extrapolated characteristic.

2. The system of claim 1, wherein the characteristic is adultness.

3. The system of claim 1, wherein the characteristic extrapolation module propagates the characteristic through the directed graph based at least partly on a number of the substitution associations.

4. A system for extrapolating item characteristics from items considered to possess a characteristic to items not known to possess the characteristic, the system comprising:
   an item data repository comprising physical computer storage, the item data repository storing item data representative of a plurality of items, the plurality of items comprising first items having a characteristic and second items not known to have the characteristic, the characteristic being an attribute other than an item association;
   an association mining module operative to programmatically analyze the item data to generate associations between the plurality of items, the associations reflecting a degree of relatedness between the plurality of items;
   a characteristic extrapolation module operative to programmatically extrapolate the characteristic from at least some of the first items known to have the characteristic to at least some of the second items not known to have the characteristic based at least partly on a strength of the associations between the plurality of items, wherein the characteristic extrapolation module is further configured to extrapolate the characteristic by propagating the item characteristic through a directed graph, the directed graph comprising nodes and edges connecting the nodes, each of the nodes representing one of the plurality of items and being associated with a characteristic value that represents the characteristic, each of the edges representing one of the associations, wherein the characteristic extrapolation module propagates the characteristic by at least updating the characteristic values of the nodes based at least in part on the strength of the associations represented by the edges connecting the nodes; and
   a recommendations module operative to generate item recommendations for a user, the item recommendations being selected from at least some of the second items that de the characteristic extrapolation module considers not to have the characteristic.

5. The system of claim 4, wherein the characteristic extrapolation module propagates the characteristic through the directed graph based at least partly on a number of associations between the plurality of items.

6. The system of claim 4, wherein the recommendations module is further operative to filter out items possessing the characteristic from a set of candidate recommendations.

7. The system of claim 6, wherein the characteristic is adultness.

8. The system of claim 6, wherein the data representative of the plurality of items is stored in an electronic catalog.

9. A method of extrapolating item characteristics, the method comprising:
   programmatically analyzing item data stored in an item data repository, the item data comprising data representative of a plurality of items in an electronic catalog, said analyzing comprising generating associations between the plurality of items, the associations reflecting a degree of relatedness between the plurality of items, wherein the plurality of items comprise first items considered to have a characteristic and second items not known to have the characteristic, the characteristic being an attribute other than an item association;

storing the associations in computer storage;

extrapolating the characteristic from at least some of the first items known to have the characteristic to at least some of the second items not known to have the characteristic based at least partly on a strength of the associations, said extrapolating the characteristic comprising: propagating the item characteristic through a directed graph, the directed graph comprising nodes and edges connecting the nodes, each of the nodes representing one of the plurality of items and being associated with a characteristic value that represents the characteristic, each of the edges representing one of the associations, said propagating comprising updating the characteristic values of the nodes based at least in part on the strength of the associations represented by the edges connecting the nodes;

storing characteristic data comprising the characteristic value for each of the plurality of items; and generating item recommendations for a user, the item recommendations being selected at least in part from the second items that do are not considered to have the characteristic as determined by said extrapolating;

wherein said analyzing, said storing the associations, said extrapolating, said storing characteristic data, and said generating are implemented by a computer system comprising computer hardware.

10. The method of claim 9, further comprising using the characteristic data to categorize at least some of the second items.

11. The method of claim 9, further comprising using the characteristic data to re-categorize items that have been mis-categorized.

12. The method of claim 9, further comprising using the characteristic data to select items to recommend to users.

13. The method of claim 9, programmatically analyzing the item data to generate associations between the plurality of items comprises creating substitution associations between the plurality of items.

14. The method of claim 9, further comprising using the characteristic data to improve recommendations related to behavior-deficient items.

15. The method of claim 9, further comprising using the characteristic data to prevent one or more types of items from being recommended to the user.

* * * * *